US012631500B2

(12) United States Patent
Whear

(10) Patent No.: US 12,631,500 B2
(45) Date of Patent: May 19, 2026

(54) METHODS AND SYSTEMS FOR MONITORING COOKING AND COOLING CYCLES OF FOOD PRODUCTS

(71) Applicant: Exceltec Canada Inc., Laval (CA)

(72) Inventor: Benoit Whear, Laval (CA)

(73) Assignee: EXCELTEC CANADA INC., Laval (CA)

( * ) Notice: Subject to any disclaimer, the term of this patent is extended or adjusted under 35 U.S.C. 154(b) by 460 days.

(21) Appl. No.: 18/028,125

(22) PCT Filed: Sep. 24, 2021

(86) PCT No.: PCT/CA2021/051330
§ 371 (c)(1),
(2) Date: Mar. 23, 2023

(87) PCT Pub. No.: WO2022/061464
PCT Pub. Date: Mar. 31, 2022

(65) Prior Publication Data
US 2023/0341271 A1       Oct. 26, 2023

Related U.S. Application Data

(60) Provisional application No. 63/082,811, filed on Sep. 24, 2020.

(51) Int. Cl.
*G01K 1/024* (2021.01)
*G01K 3/00* (2006.01)
*H04Q 9/00* (2006.01)
(52) U.S. Cl.
CPC ............. *G01K 3/005* (2013.01); *G01K 1/024* (2013.01); *H04Q 9/00* (2013.01); *G01K 2207/02* (2013.01); *H04Q 2209/40* (2013.01)

(58) Field of Classification Search
CPC ........... G01K 3/005; G01K 7/18; G01K 7/42; G01K 1/024; G01K 2207/02; G01K 3/00;
(Continued)

(56) References Cited

U.S. PATENT DOCUMENTS 6,142,666 A * 11/2000 Koether ............... H05B 1/0269
374/149
7,703,389 B2 4/2010 McLemore et al.
(Continued)

FOREIGN PATENT DOCUMENTS

| CN | 205338704 | 6/2016 |
| CN | 108267233 | 7/2018 |
| EP | 1275945 | 1/2003 |

OTHER PUBLICATIONS

"5 Best WIFI Meat Thermometers—2018 Review & Buyers Guide", Smoking Meat Geeks, Copyright © 2018.
(Continued)

*Primary Examiner* — Peter J Macchiarolo
*Assistant Examiner* — Mireille S Sadate-Moualeu
(74) *Attorney, Agent, or Firm* — Norton Rose Fulbright Canada LLP

(57) ABSTRACT

A method for monitoring a food production process, includes: receiving real-time temperature data associated with a food product during the food production process; processing the real-time temperature data to produce a temperature profile for the food product; comparing the temperature profile to a temperature benchmark associated with the food production process; and raising an alert associated with the food production process when the temperature profile differs from the temperature benchmark beyond a predetermined threshold.

20 Claims, 8 Drawing Sheets

(58) Field of Classification Search
CPC ................. H04Q 9/00; H04Q 2209/40; H04Q
2209/823; G08C 17/02
USPC ................................. 374/100, 137, 136, 124
See application file for complete search history.

(56) References Cited

U.S. PATENT DOCUMENTS

| | | | |
|---|---|---|---|
| 7,711,515 B2 | 5/2010 | Burdett et al. | |
| 8,101,892 B2 | 1/2012 | Kates | |
| 8,730,038 B2 | 5/2014 | Durian | |
| 9,811,788 B2 | 11/2017 | Dillard et al. | |
| 10,058,206 B2 | 8/2018 | Cote | |
| 2013/0269539 A1* | 10/2013 | Polt | F24C 7/085 |
| | | | 99/331 |
| 2015/0027321 A1 | 1/2015 | Yu | |
| 2016/0282191 A1 | 9/2016 | Hocker et al. | |
| 2017/0220985 A1 | 8/2017 | White et al. | |

OTHER PUBLICATIONS

"Flashlink BLE (Bluetooth Low Energy) Reusable Temperature Data Logger With External Sharp Probe", Model 40902, © 2018 DeltaTrak Inc.
"Data Logging Solutions for Restaurant Temperature Monitoring", MadgeTech.
"Digi International Introduces Patented Data Logger as Part of Its SafeTemps Solution for Transporting Perishable Goods", PR Newswire, Aug. 14, 2017, Copyright Ó 2018 ProQuest LLC.
"Configurable Thermocouple Dataloggers communicate over Wi-Fi", Product News Network : NA. Thomas Industrial Network, Inc. (Nov. 7, 2014), Copyright Ó 2018 ProQuest LLC.
"Using Data Loggers in the Meat and Poultry Industries", © Tinytag 2018.
"Wireless Sensors for Continuous and Batch Cooking Processes and Food Processing Allowing for Real-Time Data Including Temperature, Weight and Airflow", WYZE Temp, Copyright © 2017 Matrix Product Development.

* cited by examiner

112

114

115

116

116A

500

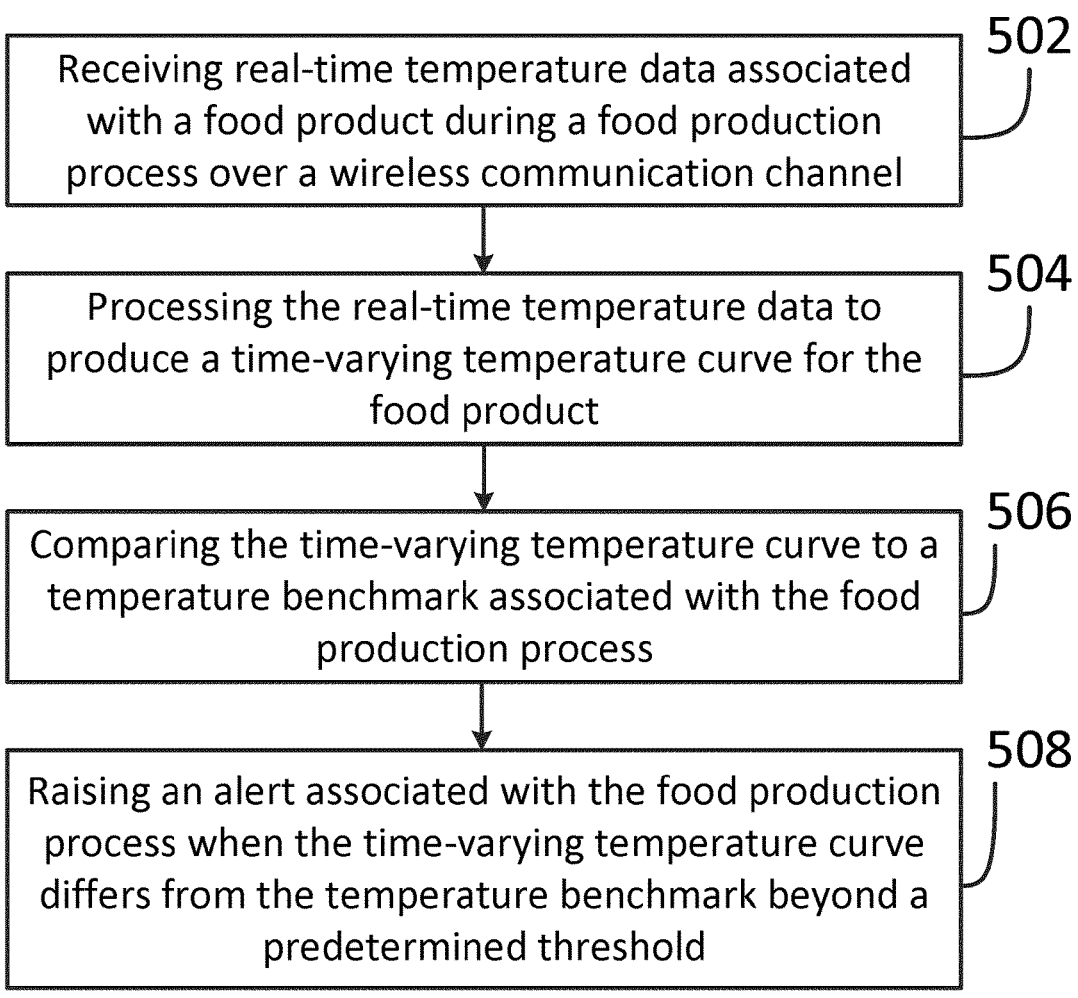

502

Receiving real-time temperature data associated with a food product during a food production process over a wireless communication channel

504

Processing the real-time temperature data to produce a time-varying temperature curve for the food product

506

Comparing the time-varying temperature curve to a temperature benchmark associated with the food production process

508

Raising an alert associated with the food production process when the time-varying temperature curve differs from the temperature benchmark beyond a predetermined threshold

FIG. 5

METHODS AND SYSTEMS FOR MONITORING COOKING AND COOLING CYCLES OF FOOD PRODUCTS

CROSS-REFERENCE TO RELATED APPLICATIONS

This application claims priority from U.S. patent application 63/082,811 filed on Sep. 24, 2020. Its content is incorporated herewith in its entirety.

TECHNICAL FIELD

The present disclosure relates generally to food production operations.

BACKGROUND OF THE ART

In a variety of food production scenarios, food producers are required to monitor temperatures of food products while processing operations are being performed. Regulatory bodies may establish a variety of regulations governing the cooking and cooling processes, which food producers must respect. Deviation from the established regulations may require that the food products be recooked or subjected to a lab analysis to assess whether they are safe for consumption. This causes time delays in the production chain, reducing efficiency and incurring additional costs. In certain cases, the regulations may require that food products be disposed of, resulting in loss of stock.

Depending on the type of food product, regulations may stipulate a number of food production parameters, including maximum and minimum temperatures, maximum and minimum time frames for achieving or maintaining certain temperatures, and the like. Existing approaches for monitoring the temperature of food product typically rely on data loggers which are collocated with the food product. At the end of a cooking or cooling cycle, the data loggers are removed and the collected data is extracted, for instance via a USB interface. While these existing approaches may be suitable for their purposes, improvements remain desirable.

BRIEF SUMMARY

In one aspect, there is provided a method for monitoring a food production process, comprising: receiving real-time temperature data associated with a food product during the food production process; processing the real-time temperature data to produce a temperature profile for the food product; comparing the temperature profile to a temperature benchmark associated with the food production process; and raising an alert associated with the food production process when the temperature profile differs from the temperature benchmark beyond a predetermined threshold.

The method may include any of the following features, in any combinations.

In some embodiments, the comparing of the temperature profile to the temperature benchmark comprises determining whether part of the temperature profile differs from a corresponding part of the temperature benchmark beyond the predetermined threshold.

In some embodiments, the comparing of the temperature profile to the temperature benchmark comprises determining whether the temperature profile is comprised within an upper bound and a lower bound defined by the temperature benchmark.

In some embodiments, the comparing of the temperature profile to the temperature benchmark comprises comparing the temperature profile to a first benchmark and to a second benchmark, and wherein the raising of the alert associated with the food production process comprises: issuing a first alert when the temperature profile differs from the first benchmark beyond a first predetermined threshold; and issuing a second alert when the temperature profile differs from the second benchmark beyond a second predetermined threshold.

In some embodiments, the comparing of the temperature profile to the temperature benchmark comprises: determining a rate of change for the temperature profile at a particular time; projecting a value for the temperature profile at a subsequent time based on the rate of change at the particular time; and comparing the projected value to the temperature benchmark.

In some embodiments, raising the alert includes issuing an indication of at least one potential fault of a food production device performing the food production process.

In some embodiments, raising the alert comprises causing a visual and/or auditory signal to be produced in a vicinity of the food production process.

In some embodiments, raising the alert comprises sending a message to an administrator associated with the food production process.

In some embodiments, the receiving of the real-time temperature data includes receiving the real-time temperature data over a wireless communication channel.

In some embodiments, the comparing the temperature profile to the temperature benchmark associated with the food production process includes: determining a projected time for the food product to increase to a determined temperature; and raising an alert if the projected time is below a first time threshold or above a second time threshold.

In some embodiments, the determining of the projected time includes extrapolating a value for the temperature profile at a subsequent time as a function of the receiving real-time temperature data.

In some embodiments, the comparing of the temperature profile to the temperature benchmark includes: issuing a warning if the temperature deviates from a steady-state temperature profile beyond a first temperature threshold; and raising an alert if the temperature deviates from the steady-state temperature profile beyond a second temperature threshold greater than the first temperature threshold.

In some embodiments, the comparing of the temperature profile to the temperature benchmark includes: determining a projected time for the food product to decrease to a determined temperature; and raising an alert if the projected time is above a time threshold.

In some embodiments, the determining of the projected time includes extrapolating a value for the temperature profile at a subsequent time as a function of the receiving real-time temperature data.

In another aspect, there is provided a system for monitoring a food production process, the system comprising: a processor; and a non-transitory computer-readable medium having stored thereon computer-readable instructions executable by the processing unit for: receiving real-time temperature data associated with a food product during the food production process, the temperature data received over a wireless communication channel; processing the real-time temperature data to produce a temperature profile for the food product; comparing the temperature profile to a temperature benchmark associated with the food production process; and responsive to determining that the temperature profile differs from the predetermined temperature profile beyond a predetermined amount, raising an alert associated with the food production process.

The system may include any of the following features, in any combinations.

In some embodiments, comparing the temperature profile to the temperature benchmark comprises determining whether part of the temperature profile differs from the temperature benchmark beyond the predetermined threshold.

In some embodiments, comparing the temperature profile to the temperature benchmark comprises determining whether the temperature profile is comprised within an upper bound and a lower bound defined by the temperature benchmark.

In some embodiments, comparing the temperature profile to the temperature benchmark comprises comparing the temperature profile to a first benchmark and to a second benchmark, and wherein raising an alert associated with the food production process comprises: issuing a first alert when the temperature profile differs from the warning benchmark beyond a first predetermined threshold; and issuing an second alert when the temperature profile differs from the warning benchmark beyond a second predetermined threshold.

In some embodiments, comparing the temperature profile to the temperature benchmark comprises: determining a rate of change for the temperature profile at a particular time; projecting a value for the temperature profile at a subsequent time based on the rate of change at the particular time; and comparing the projected value to the temperature benchmark.

In some embodiments, raising the alert includes issuing an indication of at least one potential fault of a food production device performing the food production process.

In some embodiments, raising the alert comprises causing a visual and/or auditory signal to be produced in a vicinity of the food production process.

In some embodiments, raising the alert comprises sending an textual message to an administrator associated with the food production process.

In some embodiments, the comparing the temperature profile to the temperature benchmark associated with the food production process includes: determining a projected time for the food product to increase to a determined temperature; and raising an alert if the projected time is below a first time threshold or above a second time threshold.

In some embodiments, the determining of the projected time includes extrapolating a value for the temperature profile at a subsequent time as a function of the receiving real-time temperature data.

In some embodiments, the comparing of the temperature profile to the temperature benchmark includes: issuing a warning if the temperature deviates from a steady-state temperature profile beyond a first temperature threshold; and raising an alert if the temperature deviates from the steady-state temperature profile beyond a second temperature threshold greater than the first temperature threshold.

In some embodiments, the comparing of the temperature profile to the temperature benchmark includes: determining a projected time for the food product to decrease to a determined temperature; and raising an alert if the projected time is above a time threshold.

In some embodiments, the determining of the projected time includes extrapolating a value for the temperature profile at a subsequent time as a function of the receiving real-time temperature data.

In yet another aspect, there is provided a system for monitoring a food production process, the system comprising: a temperature sensor coupleable to a food product undergoing the food production process, the temperature sensor configured for obtaining real-time temperature data from the food product; a wireless transmitter communicatively coupled to the temperature sensor for transmitting the real-time temperature data; and a computing system configured for: receiving the real-time temperature data from the wireless transmitter; processing the real-time temperature data to produce a temperature profile for the food product; comparing the temperature profile to a temperature benchmark associated with the food production process; and raising an alert associated with the food production process when the temperature profile differs from the temperature benchmark beyond a predetermined threshold.

In still another aspect, there is provided a method for monitoring a food production process, comprising: receiving real-time temperature data associated with a food product during the food production process; determining a projected time for a temperature of the food product to reach a given temperature as a function of the received real-time temperature data; and raising an alert associated with the food production process when the projected time differs from a prescribed time by a given time value.

In some embodiments, the determining of the projected time includes performing a regression of the received real-time temperature data and the determining of the projected time includes determining the projected time based on the regression.

BRIEF DESCRIPTION OF THE DRAWINGS

FIG. 5 is a flowchart illustrating an example process for monitoring a food production process.

DETAILED DESCRIPTION

Figure 1A:
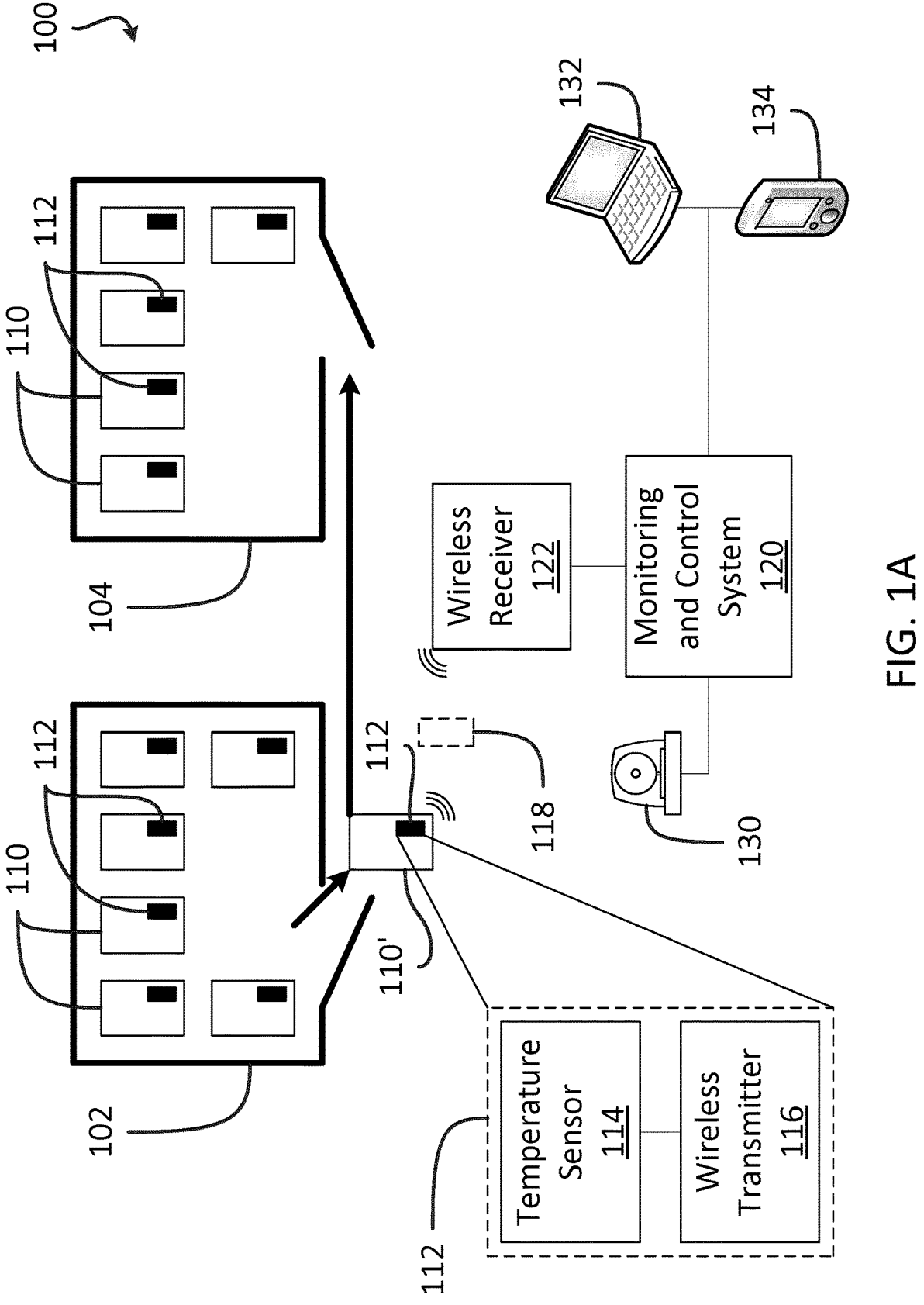
FIG. 1A is a block diagram of an example food production system.

With reference to FIG. 1A, there is illustrated a food production system 100 which is used in the preparation of various types of food products for sale and consumption. The food production system 100 may be implemented in an industrial setting, for instance as part of a production line in a factory, which performs one or more food production steps as part of a food production operation. The food production system 100 includes of one or more food production devices: in the embodiment of FIG. 1A, the food production system 100 has an oven 102 and a cooler 104. It should be understood, however, that the food production system 100 may include any suitable number of food production devices, including smokers, steamers, showers, and the like.

In many industrial food production settings, food products are loaded into movable transport devices, illustrated here as racks 110. For example, the racks 110 are equipped with wheels or other moving elements which allows the racks 110 to be displaced. The food product may be moved between different food production devices, for instance from the oven 102 to the cooler 104, by way of the racks 110. For example, as illustrated in FIG. 1A, the rack 110' is removed from the oven 102, for instance after a cooking cycle. The rack 110' may then be moved to the cooler 104, where the food product stored thereon will be subject to a cooling cycle.

Depending on the type of food product being processed, certain jurisdictions or regulatory agencies mandate that food products be processed in accordance with predetermined regulations. These regulations may dictate cooking times, cooking temperatures, and the like. For instance, a particular regulation requires that a food product be heated to a predetermined temperature within a first time period, and that the food product be maintained at the predetermined temperature for a second time period. In another example, a particular regulation requires that once a cooking cycle for a food product is complete, the food product is cooled to a predetermined temperature within a third time period. To ensure compliance with existing regulations, food producers use temperature-sensing devices affixed to racks 110, or inserted in the food product disposed within the racks 110. Typically, these temperature sensors are removed from the racks 110 or the food product after a food production cycle (e.g., a cooking cycle, a smoking cycle, a cooling cycle, or the like) in order to perform data extraction, whereby the data collected by the temperature sensors is transferred therefrom to a computer or similar system. As a result, temperature data collected from the food product is only available once the food production cycle is complete, and any deviations from established regulations can only be ascertained thereafter. This limits the ability of food producers to detect deviations from regulations as they are occurring, which can in turn result in wasted food product or lost time due to re-cooking or external analysis of the food product.

With continued reference to FIG. 1A, in order to address at least some of the shortcomings of existing food production systems, it is considered that the food production system 100 includes a monitoring and control system 120 and a wireless receiver 122. The processing system is also provided with one or more monitoring devices, illustrated at 112, which are associated with respective racks 110. The monitoring devices 112 are configured for monitoring the temperature of the food product during processing, and wirelessly providing temperature data to the monitoring and control system 120 in real-time. In this fashion, the monitoring and control system 120 can detect anomalies or deviations from regulations as they are occurring, thereby reducing the risk of the food product not being processed according to the established regulations. The different components of the control system 120 may communicate between them via the LoRaWAN protocol, but any other suitable wireless communication means are contemplated. In some cases, wired connections may be used.

In some embodiments, all of the monitoring devices 112 may communicate with the wireless receiver 122 (e.g., gateway). The wireless receiver 122 may communicate with a computer 132 and/or mobile device 134 via an Ethernet connection, or any other suitable communication means. The wireless receiver may include an enclosure, which may be IP67 certified.

Figure 1B:
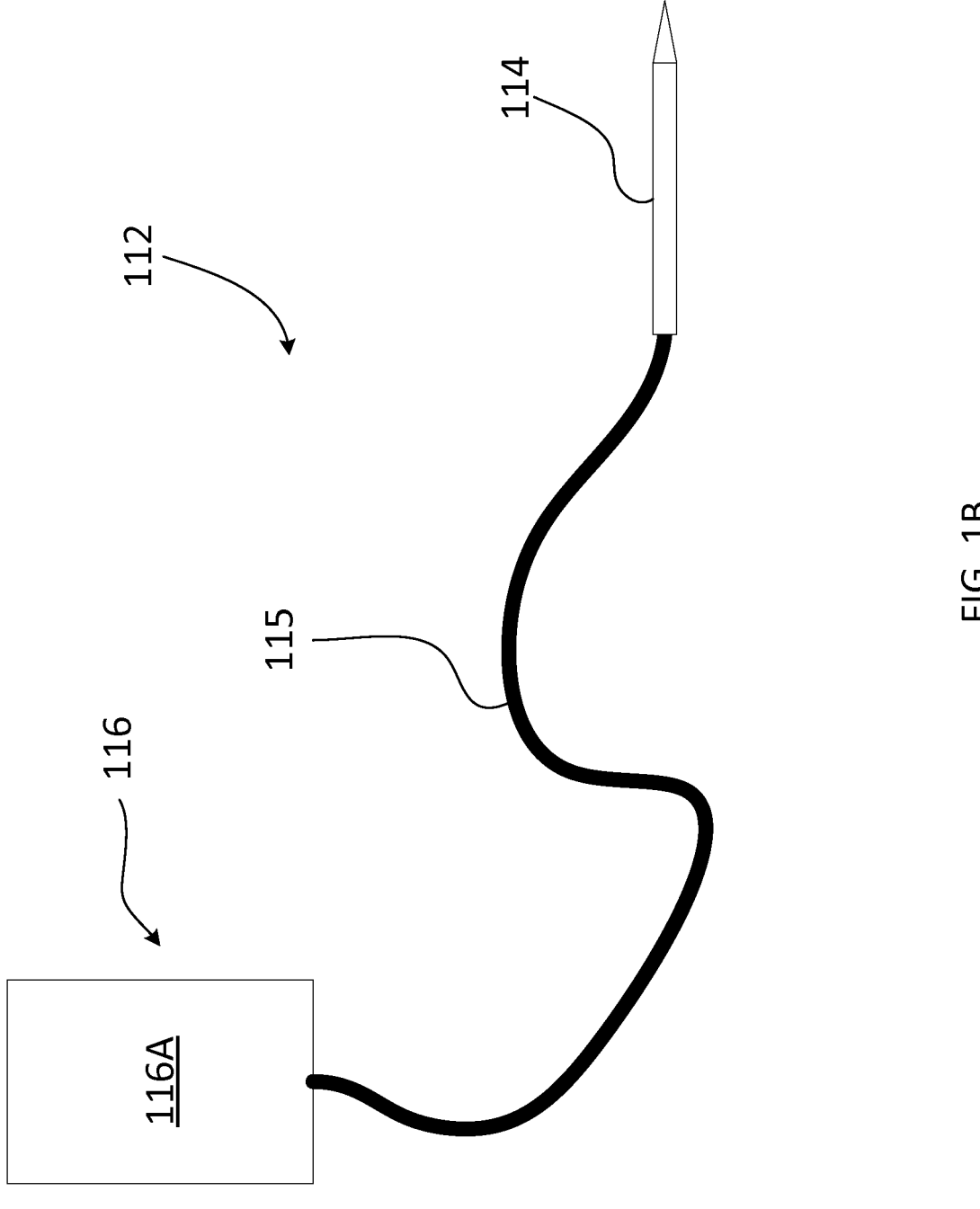
FIG. 1B is a schematic view of an exemplary monitoring device of the system of FIG. 1A.

Referring to FIG. 1B, one of the monitoring device 112 is shown in greater detail. The monitoring devices 112, which may also be referred to as loggers, are composed of a temperature sensor 114 and a wireless transmitter 116. The temperature sensor 114 may be inserted in, or affixed to, a food product, in order to sense the temperature of the food product. Alternatively, the temperature sensor 114 can be disposed in the vicinity of the food product and measure the temperature of the environment in which the food product is located. The temperature sensor 114 can be any suitable type of temperature sensor, which may acquire temperature data at any suitable frequency. The temperature sensor 114 and the wireless transmitter 116 are communicatively coupled, allowing the wireless transmitter 116 to obtain the temperature data acquired by the temperature sensor 114. The wireless transmitter 116 transmits the temperature data acquired by the temperature sensor 114 over a wireless communication channel to the receiver 122 of the monitoring and control system 120. The particular wireless protocols used by the wireless transmitter 116 and the monitoring and control system 120, as well as the encoding techniques, can vary based on the implementation. The temperature sensor 114 and the wireless transmitter 116 can be coupled through any suitable wireless and/or wired techniques.

Each of the monitoring devices 112 may include a heat resistant housing 116A that may be hooked to cooking racks. The housing 116A houses the wireless transmitter 116. The temperature sensor 114 may include a RTD 2 wires probe to read internal temperature of the product being cooked. An operating range of the monitoring devices 112 may be between −20 and 125 degrees Celsius since they may operate inside the oven 102 and the cooler 104. The monitoring devices 112 may meet IP67 certification to be operated in high humidity ambient, steam, and water washings facilities. The monitoring devices 112 may be battery-powered and may be turned off for increasing battery life. They may include a G sensor (e.g., accelerometer) to manually start the device after sleep. A wire 115 may operatively connect the temperature sensor 114 to the wireless transmitter 116.

In some embodiments, the monitoring devices 112 are provided with a securing mechanism via which they can be permanently or semi-permanently affixed to the racks 110. For example, the wireless transmitter 116 can be provided in an enclosure that is removably affixable to a portion of the rack 110. A cable or other connector which communicatively couples the temperature sensor 114 and the wireless transmitter 116 can also physically tether the temperature sensor 114 to the wireless transmitter 116, for instance by coupling to the aforementioned enclosure. In some other embodiments, the temperature sensor 114 and the wireless transmitter 116 are wirelessly coupleable, for instance via Bluetooth or a similar wireless protocol. The wireless transmitter 116, whether in an enclosure or not, may be affixable to the rack 110, and the temperature sensor 114 may be physically separated therefrom. It should be noted that in some embodiments, an individual rack 110 may be provided with more than one monitoring device 112, for instance so that multiple temperature sensors 114 can obtain temperature data from different portions of the food product being processed.

The monitoring and control system 120 is configured for receiving the temperature data from the monitoring device 112, and for processing the temperature data to monitor the food production process occurring in the oven 102 and/or in the cooler 104. The monitoring and control system 120 may be embodied as a server that gather all of the data sent from the temperature sensor 114 via the wireless transmitter 116. In the embodiment illustrated in FIG. 1A, the food processing system 100 is composed of the singular wireless receiver 122 and the monitoring and control system 120. It should however be understood that in other embodiments, the food processing system 100 includes multiple wireless receivers 112 in communication with the monitoring and control system 120, and/or includes one or more wireless repeaters 118 which serve to communicatively couple the monitoring devices 112 to the monitoring and control system 120. The wireless receiver 122 is communicatively coupleable to the monitoring devices 112, for instance via respective wireless transmitters 116, for receiving therefrom the temperature data recorded by the temperature sensors 114. As noted above, the particular wireless protocols and encoding techniques used to effect communication between by the wireless transmitter 116 and the wireless receiver 122 can vary from one implementation to another.

The wireless receiver 122 and the monitoring and control system 120 are communicatively coupled to one another in any suitable fashion. In some embodiments, the monitoring and control system 120 is implemented by way of a suitable computing device, which can have integrated therein the wireless receiver 122 and which uses any suitable computing components to implement the functionality ascribed to the monitoring and control system 120.

The monitoring and control system 120 is couplable to any suitable number of external devices, illustrated in FIG. 1A as including an alarm 130, the computer 132, and the mobile device 134. The monitoring and control system 120 may be configured for raising alerts based on the temperature data received from the monitoring device 112 and/or based on various analyses performed using the temperature data. For example, the monitoring and control system 120 raises an alert via the alarm 130, which causes a visual signal and/or an auditory signal to be produced, which may include a flashing light, an alarm sound, or the like. The visual and/or auditory signals can be perceived by administrators responsible for operating the oven 102 and/or the cooler 104, who can then investigate the alert, for instance via the monitoring and control system 120, and take appropriate action. In another example, the monitoring and control system 120 raises the alert by issuing a message (textual or otherwise) to the computer 132 and/or to the mobile device 134. The message can include any suitable information, including the nature of the alert, one or more potential faults of the food production devices, one or more possible solutions to implement, and the like. For instance, the message can indicate a potential fault of a door of the oven 102 being left open, of a cooling system of the cooler 104 malfunctioning, or of a malfunctioning temperature sensor 114, for instance if the temperature data provided by one temperature sensor 114 in a group of racks 110 differs from the temperature data provided by the other temperature sensors 114.

During a food production process, the monitoring and control system 120 receives the temperature data from the monitoring device 112, and is configured for analyzing the temperature data to monitor food production processes performed by food production devices, for instance the oven 102 and the cooler 104 of FIG. 1A. As noted hereinabove, certain regulatory agencies set out specific requirements for food production which must be observed by food producers, failing which a food product may require reprocessing or be disposed of. To this end, the monitoring and control system 120 is provided with, or develops, one or more temperature benchmarks against which the temperature data is compared, in order to determine whether the food product is being processed in accordance with the established regulatory requirements.

Figure 2A:
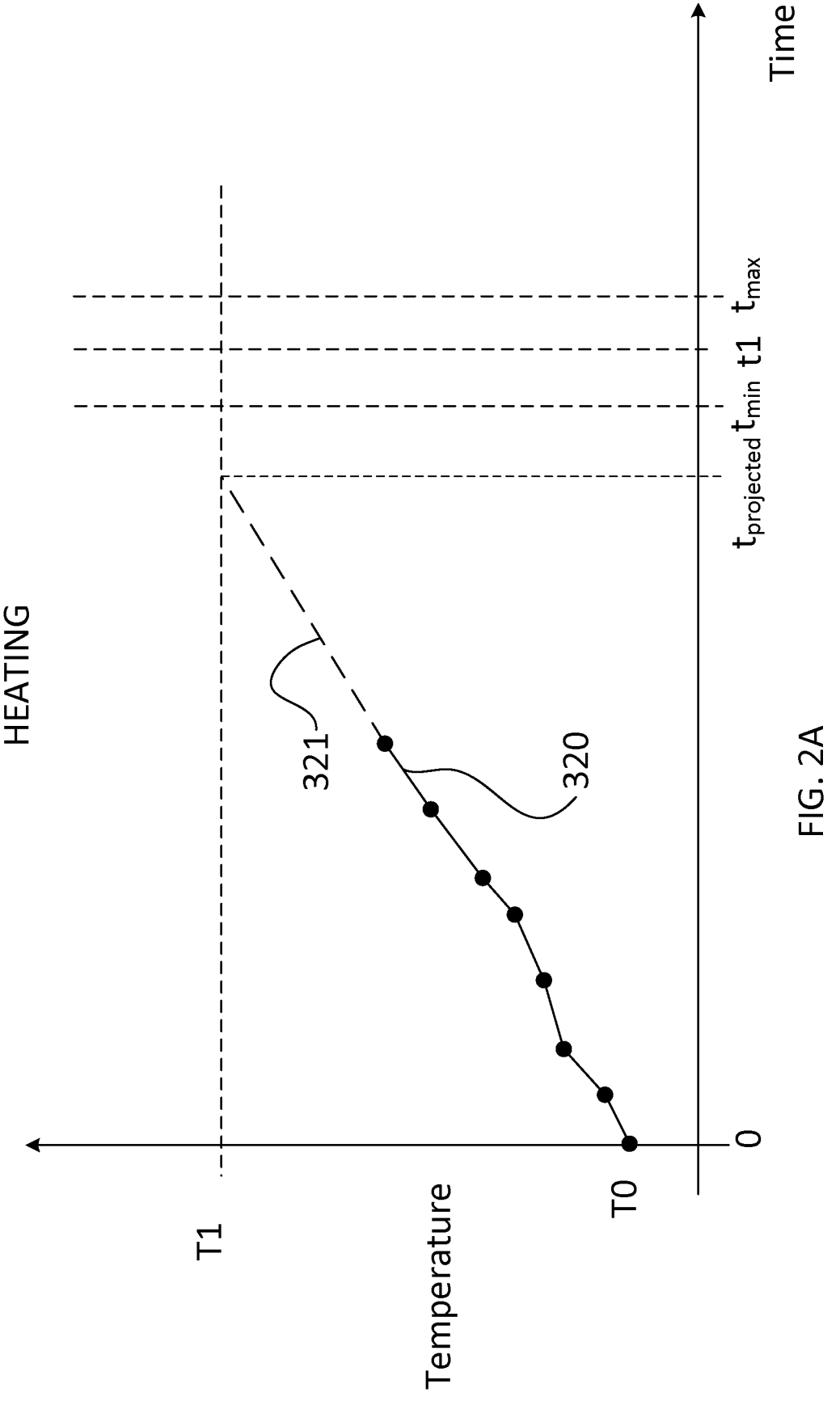
FIG. 2A is an example graph illustrating a variation of a temperature of a product during a heating step of a cooking process.

Referring now to FIG. 2A, a temperature profile for a heating step of a cooking process is illustrated. During the heating step, the product is heated from an initial temperature T0 to a final temperature T1. The monitoring and control system 120 may gather temperature data at a plurality of time periods and determine whether or not the temperature increases as it should. An alarm may be generated if it is not the case since this may imply a problem with the oven 102 and/or with one or more of the temperature probe(s) 114.

FIG. 2A illustrates a temperature profile 320 of an actual temperature of the product being cooked. The monitoring and control system 120 may issue an alarm when the temperature is decreasing during the heating step since a decreasing temperature during the heating step may be an indication of a malfunction of the oven 102. In other words, the monitoring and control system 120 may issue an alarm if the temperature of the product is not continuously increasing during the heating step. For instance, if the temperature is constant for a given time interval, a warning/alarm may be issued. If the temperature is decreasing, a warning/alarm may be issued.

During the heating step, the temperature of the product should increase from an initial temperature T0 to a final temperature T1 within a specific or prescribed time interval t1. For instance, the product may have to increase from the initial temperature T0 to the final temperature T1 within at least a first time interval and within at most a second time interval greater than the first time interval. These two time intervals correspond to $t_{min}$ and $t_{max}$ on FIG. 2A. For example, the product may have to increase from 20 degrees Celsius to 75 degrees Celsius in no more than 2 hours but not before 1 hour.

The monitoring and control system 120 may be able to predict the time at which the product will reach the desired final temperature T1. As shown in FIG. 2A, a prediction curve 321 may be generated from the temperature data points of the actual profile 320. A regression may be carried based on the actual temperature data points of the actual profile 320. This extrapolation may predict a time $t_{projected}$ at which the product is expected to reach the desired final temperature T1. In the case of FIG. 2A, the projected time $t_{projected}$ is less than the minimal time $t_{min}$. This implies that the heating of the product occurs faster than desired. Hence, the monitoring and control system 120 may issue a warning or an alarm notifying a user of this abnormality. In other words, an alert or warning may be raised when the projected time differs from a prescribed time by a given time value (e.g., 30 minutes). Corrective actions may then be taken to rectify the heating. This may be done, for instance, by varying the internal temperature of the oven 102.

This prediction may be carried at every pre-determined time intervals (e.g., every 5 minutes). In some cases, a learning period may be set. The learning period allows the monitoring and control system 120 to gather sufficient temperature data points of the actual profile 320 in order to generate an accurate extrapolation of the cooking time to reach the desired final temperature T1. The prediction may be carried via a regression based on the gathered temperature data points. The regression may be linear, polynomial, Support Vector Machine, Support Vector Classifier, and any suitable combination any of the above regression methods. For instance, the regression may be linear for a first time range and polynomial for a second time range. Any suitable extrapolation method may be used.

In some cases, the heating may include a plurality of criteria. For instance, it may be required to heat the product from the initial temperature T0 to an intermediate temperature being less than the final temperature T1 within less than a first time interval and to heat the product from the initial temperature T0 to the final temperature T1 within a second time interval, which is greater than the first time interval. In some cases, it may be required to heat the product from the initial temperature T0 to an intermediate temperature within less than a first time interval and to heat the product from the intermediate temperature to the final temperature T1 within a second time interval. The monitoring and control system 120 may performed regression at any particular time to determine whether or not the heating step is expected to meet these criteria.

Figure 2B:
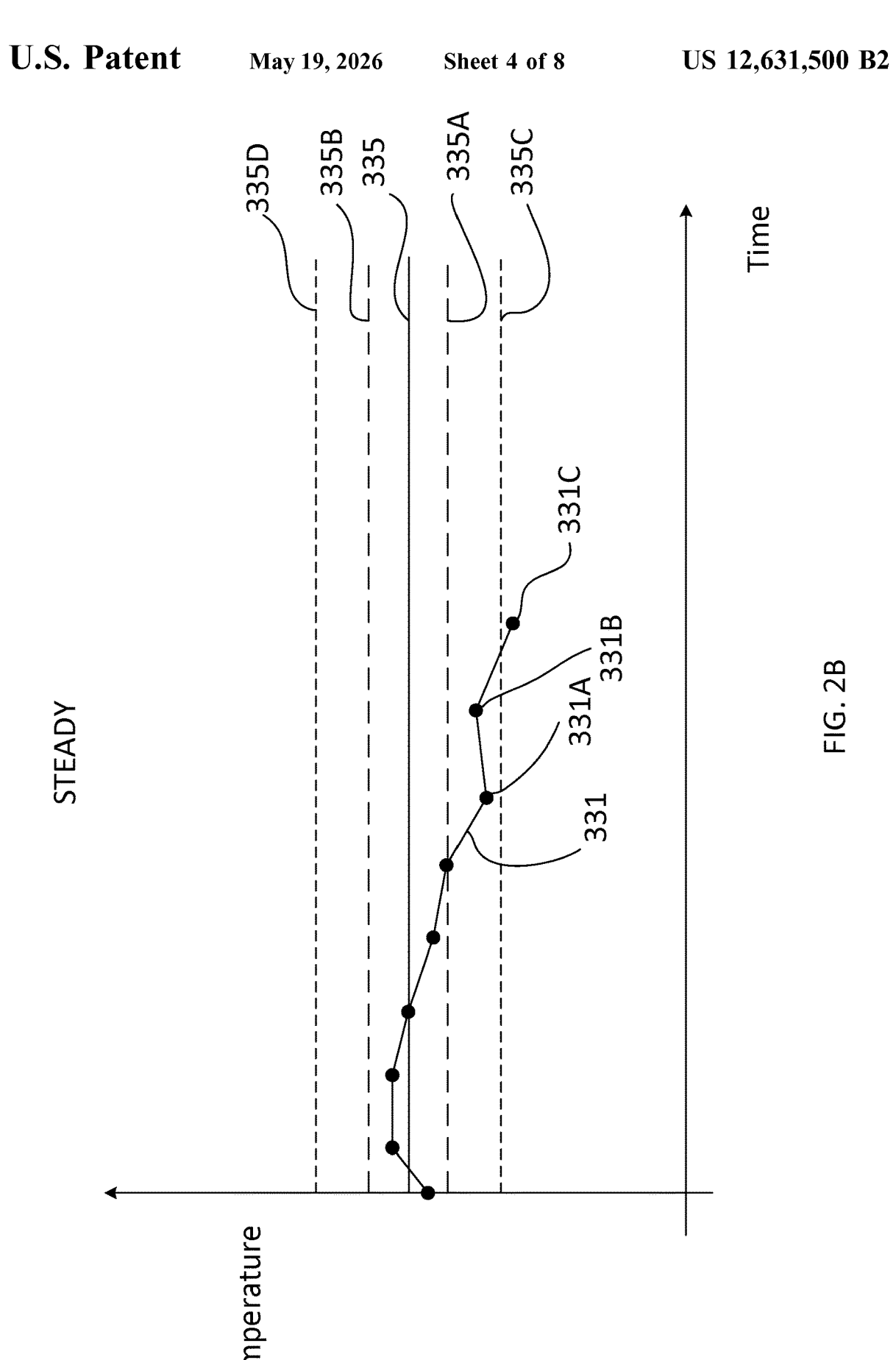
FIG. 2B is an example graph illustrating a variation of a temperature of a product during a steady-state step of the cooking process.

Referring now to FIG. 2B, in some cases, a steady-state step follows the heating step. During the steady-stage step, a temperature of the product is to be maintained at a specific temperature, depicted with the optimal temperature profile 335. However, as explained above, temperature variations may arise. The monitoring and control system 120 gathers data point about the temperature and an actual temperature profile 331 is generated.

The monitoring and control system 120 may issue warning when the temperature of the product falls below a first low temperature threshold 335A or exceeds a first high temperature threshold 335B. The monitoring and control system 120 may issue an alarm when the temperature of the product falls below a second low temperature threshold 335C, which is less than the first low temperature threshold 335A, or when the temperature exceeds a second high temperature threshold 335D, which is greater than the first high temperature threshold 335B.

As shown in FIG. 2B, two warnings may be generated for the markers 331A, 331B and an alarm may be generated for another marker 331C. In some embodiments, an extrapolation may be carried to predict whether or not the temperature is expected to fall under or rise higher than the different thresholds, 335A, 335B, 335D, 335D.

Figure 2C:
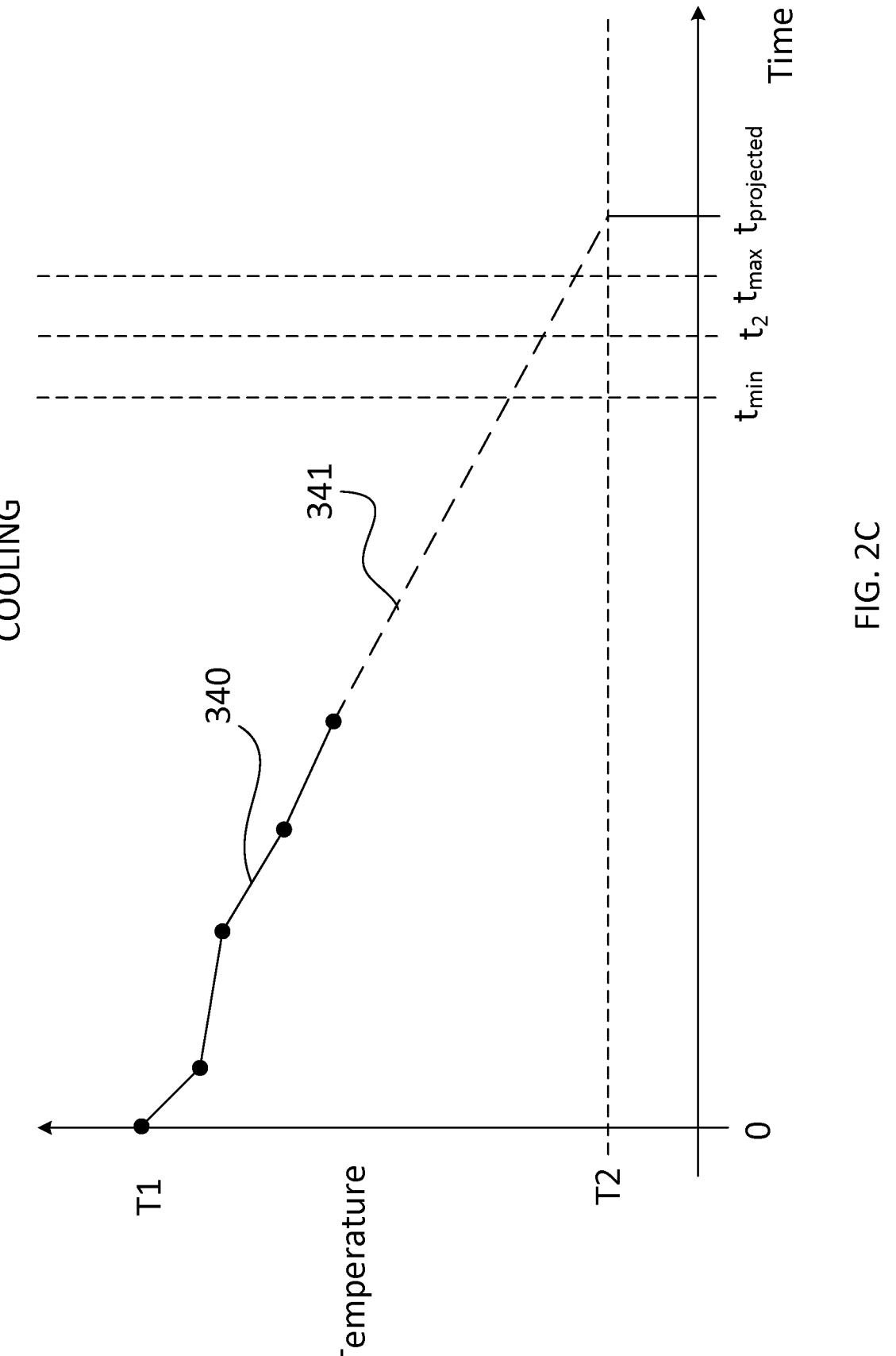
FIG. 2C is an example graph illustrating a variation of a temperature of a product during a cooling step of the cooking process.

Referring now to FIG. 2C, in some embodiments, a cooling step follows the steady-state step. During the cooling step, it may be required that the temperature of the product does not remain between a given temperature range for more than a given time interval. FIG. 2C illustrates an actual temperature profile 340 during the cooling step. As shown a maximum time $t_{max}$ is allowed for the cooling of the product to decrease in temperature from an initial temperature, which may correspond to the final temperature T1 of the heating step, to a final temperature T2.

During the cooling step, the temperature of the product should decrease from the initial temperature T1 to the final temperature T2 within a specific or prescribed time interval $t_2$. For instance, the product may have to cool down from the initial temperature T1 to the final temperature T2 within at least a first time interval and within at most a second time interval greater than the first time interval. These two time intervals correspond to $t_{min}$ and $t_{max}$ on FIG. 2C. The monitoring and control system 120 may be able to send warnings/alarms if the cooling step is projected to be too fast or too slow.

The monitoring and control system 120 may issue an alarm when the temperature is increasing during the cooling step since an increase in temperature during the cooling step may be an indication of a malfunction of the cooler 104. In other words, the monitoring and control system 120 may issue an alarm if the temperature of the product is not continuously decreasing during the cooling step. For instance, if the temperature is constant for a given time interval, a warning/alarm may be issued. If the temperature is increasing, a warning/alarm may be issued.

The monitoring and control system 120 may be able to predict the time at which the product will reach the desired final temperature T2. As shown in FIG. 2C, a prediction curve 341 may be generated from the temperature data points of the actual profile 340. A regression may be carried based on the actual temperature data points of the actual profile 320. This regression may predict a time $t_{projected}$ at which the product is expected to reach the desired final temperature T2. In the case of FIG. 2C, the projected time $t_{projected}$ is more than the maximal time $t_{max}$. This implies that the cooling of the product occurs slower than allowed. Hence, the monitoring and control system 120 may issue a warning or an alarm notifying a user of this abnormality. In other words, an alert or warning may be raised when the projected time differs from a prescribed time by a given time value (e.g., 30 minutes). Corrective actions may then be taken to rectify the cooling. This may be done, for instance, by varying the internal temperature of the cooler 104.

This regression may be carried at every pre-determined time intervals (e.g., every 5 minutes). In some cases, a learning period may be set. The learning period allows the monitoring and control system 120 to gather sufficient temperature data points of the actual profile 320 in order to generate an accurate extrapolation of the cooking time to reach the desired final temperature T2.

In some cases, the cooling may include a plurality of criteria. For instance, it may be required to cool down the product from the temperature of the product after the steady-state step to an intermediate temperature within less than a first time interval and to cool down the product from the temperature of the product after the steady-state step to the final temperature T2 within a second time interval, which is greater than the first time interval. For example, it may be required to cool the product from 49 degrees Celsius to 4 degrees Celsius within no more than 20 hours. In some cases, it may be required to cool down the product from 54 degrees Celsius and 27 degrees Celsius within no more than 20 hours and it may be required that the product cools down from 54 degrees Celsius to 4 degrees Celsius within no more than 7 hours. The monitoring and control system 120 may performed regression at any particular time to determine whether or not the heating step is expected to meet these criteria.

In some cases, it may be required to cool down the product from the temperature of the product after the steady-state step to an intermediate temperature within less than a first time interval and to cool down the product from the intermediate temperature to the final temperature T2 within a second time interval. For example, it may be required to cool the product from 54.4 degrees Celsius to 26.6 degrees Celsius within no more than 1.5 hours and to cool down the product from 26.6 degrees Celsius to 4.4 degrees Celsius within no more than 5 hours.

The monitoring and control system 120 may be configured to issue a plurality of alarms, which may include process alarms, technical alarms, and notifications. Process alarms relate to the temperature behaviour and prediction.

Technical alarms relate to the hardware. Notifications are a special type of process alarm. The alarms are summarized in the table below.

| Name | Description | Category |
|---|---|---|
| High alarm | High alarm limit reached for Steady step | Process |
| High warning | High warning limit reached for Steady step | Process |
| Low warning | Low warning limit reached for Steady step | Process |
| Low alarm | Low alarm limit reached for Steady step | Process |
| Wrong alignment with trend | Temp pattern not aligned with trend | Process |
| Fast trend | Predicted time lower than minimum time | Process |
| Slow trend | Predicted time higher them maximum time | Process |
| Logger communication failure | Failure contacting logger | Technical |
| Gateway communication failure | Failure contacting gateway | Technical |
| Battery warning | Battery warning limit reached | Technical |
| Battery low | Battery low limit reached | Technical |
| Battery dead | Battery dead | Technical |
| Calibration expired | Logger sensor calibration expired | Technical |
| Completed batch | Batch completed | Notification |
| Acknowledged batch | Batch acknowledged by user | Notification |

The monitoring and control system may include a graphical user interface (GUI) that may include a process information area displaying batch and product information (e.g., batch number, product number, quantity, customer, current step, state, etc). The GUI may display the graphs, for instance the graphs shown in FIGS. 2A to 2C, The GUI may have one or more recipe tabs in which parameters (e.g., time, temperatures, criteria, etc) of each of the heating, steady-state, and/or cooling step are displayed.

Figure 3:
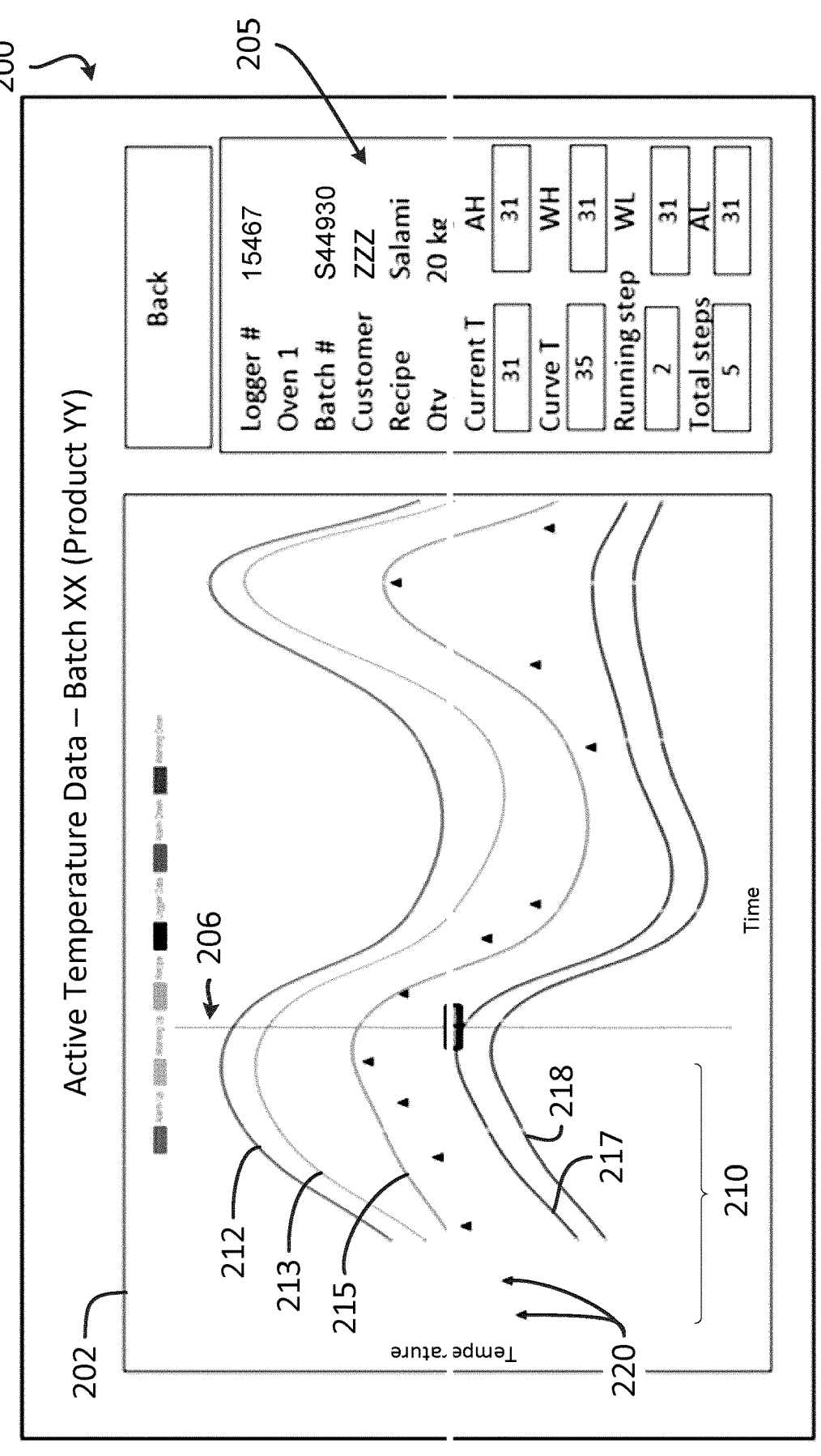
FIG. 3 is an example graphical user interface for monitoring a food production process.

With additional reference to FIG. 3, an example graphical user interface (GUI) 200 is illustrated. The GUI 200 can be presented by the monitoring and control system 120, for instance via a screen associated therewith, or via the computer 132 and/or the mobile device 134. For example, the monitoring and control system 120 is accessible to the computer 132 and/or to the mobile device 134 via an application-program interface (API), or via some other approach, via which the monitoring and control system 120 can provide the computer 132 and/or the mobile device 134 with the GUI 200, or with the information required to produce the GUI on the computer 132 and/or the mobile device 134. The GUI 200 includes a chart area 202, which illustrates a temperature benchmark at 210 and the temperature data obtained from the monitoring device 112, in the form of a temperature profile 220. The GUI 200 also includes various food production parameters 205, which can include an identifier associated with the monitoring device 212, an identifier indicating the food production batch number, the food production recipe, client, and lot size, and the like. The food production parameters 205 can also include a numerical representation of temperatures at a selected time, which may be indicated by the cursor 206.

In some embodiments, the temperature benchmark 210 used by the monitoring and control system 120 may take the form of one or more curves, illustrated here as curves 212, 213, 215, 217, and 218 (collectively the "benchmark 210"). The benchmark 210 may be provided to the monitoring and control system 120 by an operator or developer associated therewith. For instance, the developer can establish the benchmark 210 by identifying various key temperatures and associated times at which the temperatures should be reached, or time periods during which the temperature should be maintained. Alternatively, or in addition, the benchmark may be developed by the monitoring and control system 120 based on rules provided by the operator or developer. For instance, the monitoring and control system 120 can be provided with maximum and minimum temperatures for different periods of a food production process, and can devise the benchmark 210 based thereon, using any suitable algorithm or set of rules. The monitoring and control system 120 is provided with different benchmarks 210 for different food production processes, and for different types of food being subjected to the same types of food production processes. For instance, different benchmarks 210 are provided for different types of meat to be smoked, and a single type of meat can be provided with different benchmarks 210 for a smoking process, a shower process, a cooling process, and the like.

The monitoring and control system 120 uses the temperature data obtained from the monitoring device 112 to produce a time-varying temperature profile of the food product being processed, illustrated in FIG. 3 by markers 220. The monitoring and control system 120 may compare the temperature profile 220 of the food product to the benchmark 210 to assess whether the food product is being processed according to the established regulatory requirements; when a deviation or discrepancy is identified, the monitoring and control system 120 raises an alert as described above. In the example depicted in FIG. 3, the temperature profile 220 is based on discrete times at which the monitoring and control system 120 received temperature data from the monitoring device 112. In some embodiments, the monitoring device 112 provides data at a higher frequency, or in a pseudo-continuous fashion, and the temperature profile 220 can include additional markers, or can be illustrated as a continuous curve. Other approaches are also considered.

In the embodiment illustrated in FIG. 3, the benchmark 210 includes two "alarm" curves 212, 218, two "warning" curves 213, 217, and a "recipe" curve 215. The recipe curve 215 represents an optimal processing temperature profile for the food product; under ideal conditions, the temperature profile 220 would be aligned with the recipe curve 215. The warning curves 213, 217 define temperatures closer to the recipe curve 215 than the alarm curves 212, 218; when the temperature profile 220 reaches the warning curves 213, 217, the monitoring and control system 120 raises a first type of alert. The alarm curves 212, 218 define temperatures farther from the recipe curve 215 and beyond the warning curves 213, 217; when the temperature profile 220 reaches the alert curves 212, 218, the monitoring and control system 120 raises a second type of alert, different from the first type. For example, the alarm curves 212, 218 indicate that the cooking process is likely to, or in the process of, failing to achieve the established regulatory requirements, which would result in a need for reprocessing or disposing of the food product, whereas the warning curves 213, 217 indicate that the cooking process is trending toward failing to achieve the established regulatory requirements. Thus, the monitoring and control system 120 can issue different alerts based on how the temperature profile 220 compares to the different curves 212, 213, 215, 217, 218 of the benchmark 210. It should be noted that in other embodiments, the benchmark 210 includes fewer, or more, curves, which can be associated with additional alerts, as appropriate.

The comparison between the temperature profile 220 and the benchmark 210 can be performed in any suitable fashion.

In some embodiments, the discrete values of the temperature profile 220 are compared to the recipe curve 215 of the temperature benchmark 210: when a value of the temperature profile differs from the recipe curve 215 beyond a predetermined threshold, for instance associated with one of the alarm curves 212, 218 or the warning curves 213, 217, the monitoring and control system 120 raises an appropriate alert. In some other embodiments, the differences between the temperature profile and the different curves 212, 213, 215, 217, 218 are determined, and the monitoring and control system 120 compares the differences to associated thresholds for each of the different curves 212, 213, 215, 217, 218 to assess whether an alert is to be raised, and which alert in particular. In some further embodiments, the temperature profile 220 is compared to upper and lower bounds established by the alarm curves 212, 218 and/or the warning curves 213, 217. When the temperature profile 220 is determined to be outside the bounds established by the warning curves 213, 217, but not beyond the bounds established by the alarm curves 212, 218, the monitoring and control system 120 issues the first alert associated with the warning curves 213, 217. When the temperature profile 220 is determined to be outside the bounds established by the alarm curves 212, 218, the monitoring and control system 120 issues the second alert associated with the alarm curves 212, 218.

Other approaches for comparing the temperature profile 220 and the benchmark 210 are also considered. For example, the monitoring and control system 120 interpolates a temperature curve based on the discrete values forming the temperature profile 220, and compare portions of the temperature curve to the curves 212, 213, 215, 217, 218 to assess whether the portions of the temperature curve exceed any one or more of the curves 212, 213, 215, 217, 218, and raise alerts when appropriate. In another example, the monitoring and control system 120 assesses one or more derivative temperature curves at one or more points along the interpolated temperature curve. The derivative temperature curves can be used to project one or more values for the temperature profile 220 at subsequent times (i.e., at times in the future for which no temperature data is available) and/or to assess rates of change for the temperature curve. The projected value(s) and/or rates of change may be used as part of the comparisons performed by the monitoring and control system 120 to assess whether the temperature profile 220 is likely to follow the recipe curve 215, or likely to approach or intersect one of the warning or alarm curves 212, 213, 217, 218. In some embodiments, the monitoring and control system 120 is configured for pre-emptively raising alerts based on the projected value(s), for instance to allow administrators responsible for operating the oven 102 and/or the cooler 104 to adjust their operation, thereby increasing the likelihood of complying with the established regulatory requirements.

In some embodiments, the monitoring and control system 120 prepares reports regarding ongoing and/or completed food production processes. The reports, which indicate the nature of the food production process performed, the type of food product, and the like, may additionally detail a degree to which the temperature profile 220 tracked to the recipe curve 215, an amount of time the temperature profile 220 was above or below the warning curves 213, 217 and/or the alarm curves 212, 218, or other relevant information. These reports can include the temperature data, for instance in a tabular format, which can be timestamped or provided with additional metadata, as appropriate, so that the reports can be used as part of an audit or other compliance process which may be executed by a relevant regulatory agency. In some embodiments, the reports are digitally signed or otherwise authenticated to indicate that they are tamperproof.

In operation, an administrator preparing a batch of food product to be subjected to a food production process provides the monitoring and control system 120 with various information. The information may be provided by an input device associated with the monitoring and control system 120, for instance the computer 132, the mobile device 134, or another input device, for instance a keyboard, a touchpad, or the like. The information may include an indication of the customer associated with the food product, the type of food product, the size of the batch, and the like, and can select a benchmark 210 for the food production process being performed. The monitoring and control system 120 receives the temperature data during the food production process from the monitoring device 112, and compares the temperature data to the benchmark 210 as described hereinabove. The monitoring and control system 120 can also produce one or more reports during or following the food production process, as appropriate. In some embodiments, once the food production process is complete, the administrator of the food production process confirms the temperature data obtained by the monitoring and control system 120, for instance using a digital signature or similar approach.

In some embodiments, each of a plurality of users having access to the monitoring and control system 120 may be assigned a respective personal identification number (PIN). This may provide traceability and accountability of the cooking process. This may allow audit trailing. In some cases, two types of users may be used: operator and administrator. Operators are users in charge of the cooking process whereas administrator may have more options to modify parameters of the monitoring and control system.

In addition, although the present disclosure focuses primarily on temperature monitoring based on temperature data gathered by the temperature sensor 114, it should be noted that the monitoring device 112 may be provided with additional sensors and/or sensing functionality. For example, the monitoring device 112 is provided with humidity-monitoring functionality and/or airflow-monitoring functionality, for instance using additional sensors. Any additional data gathered by the monitoring device 112 (e.g. humidity data, airflow data, and the like) can be transmitted to the monitoring and control system 120 and processed similarly to temperature data, as described above.

Figure 4:
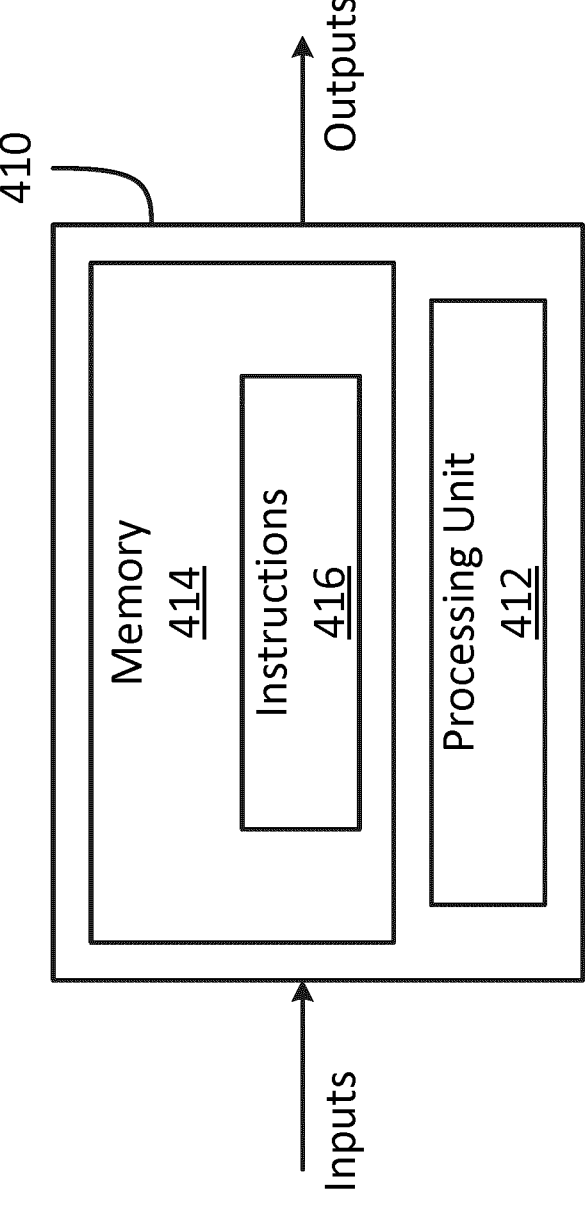
FIG. 4 is a schematic diagram of an example computing system for implementing part of the food production system of FIG. 1A.

With reference to FIG. 4, the monitoring and control system 120 may be implemented by a computing device 410, comprising a processing unit 412 and a memory 414 which has stored thereon computer-executable instructions 416. It should be noted that the monitoring device 112 may also be implemented by way of the computing device 410, although the monitoring device 112 and the monitoring and control system 120 are separate entities, and would be implemented by different computing devices 410.

The processing unit 412 may comprise any suitable devices configured to implement the functionality ascribed to the monitoring and control system 120 such that instructions 416, when executed by the computing device 410 or other programmable apparatus, may cause implementation of some or all of the functionality ascribed to the monitoring and control system 120 described herein. The processing unit 412 may comprise, for example, any type of microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

With reference to FIG. 5, there is illustrated a method 500 for monitoring a food production process. The method 500 may be implemented, for example, by the monitoring and control system 120. The method 500 includes, at step 502, receiving real-time temperature data associated with a food product during the food production process. The temperature data is received over a wireless communication channel, for instance the wireless communication channel established between the wireless transmitter 116 and the wireless receiver 122 of FIG. 1. The temperature data can be received at any suitable frequency, and using any suitable communication protocol and encoding. In some embodiments, the temperature data includes a timestamp or other relevant metadata, for instance an indication of the food production device in which the temperature sensor 114, which records the temperature data, is located, or the like.

The method 500 includes, at step 504, processing the real-time temperature data to produce a temperature profile for the food product. In some embodiments, the temperature profile produced by the monitoring and control system 120 includes a temperature curve based on an interpolation between discrete temperature data points received at step 502.

The method 500 includes, at step 506, comparing the temperature profile to a temperature benchmark associated with the food production process. The temperature benchmark may be defined by one or more curves, one or more pairs of upper and lower bounds, or the like. The comparison between the temperature profile and the temperature benchmark may include comparing discrete temperature data values to the temperature benchmark, comparing portions of an interpolated temperature curve to the temperature benchmark, obtaining projected temperature values based on a derivative and/or a rate of change of the interpolated temperature curve, or the like.

The method 500 includes, at step 508, raising an alert associated with the food production process when the temperature profile differs from the temperature benchmark beyond a predetermined threshold. For example, the temperature benchmark includes a recipe curve, and when the temperature profile differs from the recipe curve by more than a predetermined amount (whether as an absolute value or a relative value), an alert is raised. In another example, the temperature benchmark includes upper and lower bound, and an alert is raised when the temperature profile is outside the bounds.

In some embodiments, the alert raised as part of step 508 includes a visual and/or auditory signal, as appropriate, to alert administrator associated with the food production process of the presence of a fault or issue with the food production process. In some embodiments, the alert additionally, or alternatively, includes sending a message to the administrator, which may include an indication of potential faults of the food production device performing the food production process.

In some embodiments, and as shown in FIG. 2A, the method 400 includes determining a projected time for the food product to increase to a determined temperature; and raising an alert if the projected time is below a first time threshold or above a second time threshold. The determining of the projected time may include extrapolating a value for the temperature profile at a subsequent time as a function of the receiving real-time temperature data.

In some embodiments, and as shown in FIG. 2B, the method 400 includes issuing a warning if the temperature deviates from a steady-state temperature profile beyond a first temperature threshold; and raising an alert if the temperature deviates from the steady-state temperature profile beyond a second temperature threshold greater than the first temperature threshold.

In some embodiments, and as shown in FIG. 2C, the method 400 includes determining a projected time for the food product to decrease to a determined temperature; and raising an alert if the projected time is above a time threshold. The determining of the projected time includes extrapolating a value for the temperature profile at a subsequent time as a function of the receiving real-time temperature data.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for nonphysical hardware, using mental steps for example, may substantially affect the way the embodiments work. Rather, such computer hardware limitations are essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The methods and systems described herein may be implemented in a high level procedural or object oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those ascribed to the monitoring and control system 120, and those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The terms "connected" or "coupled to" may include both direct coupling (in which two elements that are coupled to each other contact each other) and indirect coupling (in which at least one additional element is located between the two elements).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

Various aspects of the methods and systems for monitoring a food production process may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for monitoring a food production process, comprising:
   receiving real-time temperature data associated with a food product during the food production process;
   processing the real-time temperature data to produce a temperature profile for the food product, including determining one or more of a projected time the food product is expected to reach a given temperature, and a projected temperature the food product is expected to reach after a given time;
   comparing the temperature profile to a temperature benchmark associated with the food production process, including comparing one or more of the projected time and the projected temperature to the temperature benchmark; and
   raising an alert associated with the food production process when the one or more of the projected time and the projected temperature of the temperature profile differs from the temperature benchmark beyond a predetermined threshold.

2. The method of claim 1, wherein the comparing of the temperature profile to the temperature benchmark comprises determining whether part of the temperature profile differs from a corresponding part of the temperature benchmark beyond the predetermined threshold.

3. The method of claim 1, wherein the comparing of the temperature profile to the temperature benchmark comprises determining whether the temperature profile is comprised within an upper bound and a lower bound defined by the temperature benchmark.

4. The method of claim 1, wherein the comparing of the temperature profile to the temperature benchmark comprises comparing the temperature profile to a first benchmark and to a second benchmark, and wherein the raising of the alert associated with the food production process comprises:
   issuing a first alert when the temperature profile differs from the first benchmark beyond a first predetermined threshold; and
   issuing a second alert when the temperature profile differs from the second benchmark beyond a second predetermined threshold.

5. The method of claim 1, wherein the comparing of the temperature profile to the temperature benchmark comprises:
   determining a rate of change for the temperature profile at a particular time;

projecting a value for the temperature profile at a subsequent time based on the rate of change at the particular time; and comparing the projected value to the temperature benchmark.

6. The method of claim 1, wherein raising the alert includes issuing an indication of at least one potential fault of a food production device performing the food production process.

7. The method of claim 1, wherein raising the alert comprises causing a visual and/or auditory signal to be produced in a vicinity of the food production process.

8. The method of claim 1, wherein raising the alert comprises sending a message to an administrator associated with the food production process.

9. The method of any one of claims 1 to 8, wherein the receiving of the real-time temperature data includes receiving the real-time temperature data over a wireless communication channel.

10. The method of claim 1, wherein the comparing the temperature profile to the temperature benchmark associated with the food production process includes:

determining a projected time for the food product to increase to a determined temperature; and raising an alert if the projected time is below a first time threshold or above a second time threshold.

11. The method of claim 10, wherein the determining of the projected time includes extrapolating a value for the temperature profile at a subsequent time as a function of the receiving real-time temperature data.

12. The method of claim 1, wherein the comparing of the temperature profile to the temperature benchmark includes:

issuing a warning if the temperature deviates from a steady-state temperature profile beyond a first temperature threshold; and raising an alert if the temperature deviates from the steady-state temperature profile beyond a second temperature threshold greater than the first temperature threshold.

13. The method of claim 1, wherein the comparing of the temperature profile to the temperature benchmark includes:

determining a projected time for the food product to decrease to a determined temperature; and raising an alert if the projected time is above a time threshold.

14. The method of claim 13, wherein the determining of the projected time includes extrapolating a value for the temperature profile at a subsequent time as a function of the receiving real-time temperature data.

15. A system for monitoring a food production process, the system comprising:

a processor; and a non-transitory computer-readable medium having stored thereon computer-readable instructions executable by the processing unit for:

receiving real-time temperature data associated with a food product during the food production process, the temperature data received over a wireless communication channel;

processing the real-time temperature data to produce a temperature profile for the food product, including determining one or more of a projected time the food product is expected to reach a given temperature, and a projected temperature the food product is expected to reach after a given time;

comparing the temperature profile to a temperature benchmark associated with the food production process, including comparing one or more of the projected time and the projected temperature to the temperature benchmark; and responsive to determining that the one or more of the projected time and the projected temperature of the temperature profile differs from the predetermined temperature profile beyond a predetermined amount, raising an alert associated with the food production process.

16. The system of claim 15, wherein comparing the temperature profile to the temperature benchmark comprises determining whether part of the temperature profile differs from the temperature benchmark beyond the predetermined threshold or, wherein comparing the temperature profile to the temperature benchmark comprises determining whether the temperature profile is comprised within an upper bound and a lower bound defined by the temperature benchmark.

17. The system of claim 15, wherein comparing the temperature profile to the temperature benchmark comprises comparing the temperature profile to a first benchmark and to a second benchmark, and wherein raising an alert associated with the food production process comprises:

issuing a first alert when the temperature profile differs from the warning benchmark beyond a first predetermined threshold; and issuing an second alert when the temperature profile differs from the warning benchmark beyond a second predetermined threshold.

18. The system of claim 15, wherein comparing the temperature profile to the temperature benchmark comprises:

determining a rate of change for the temperature profile at a particular time;

projecting a value for the temperature profile at a subsequent time based on the rate of change at the particular time; and comparing the projected value to the temperature benchmark.

19. The system of claim 15, wherein raising the alert includes one or more of: issuing an indication of at least one potential fault of a food production device performing the food production process, causing a visual and/or auditory signal to be produced in a vicinity of the food production process, and sending a textual message to an administrator associated with the food production process.

20. The method of claim 15, wherein the comparing the temperature profile to the temperature benchmark associated with the food production process includes:

determining a projected time for the food product to increase to a determined temperature; and raising an alert if the projected time is below a first time threshold or above a second time threshold; or determining a projected time for the food product to decrease to a determined temperature; and raising an alert if the projected time is above a time threshold.

* * * * *